United States Patent

Wood et al.

[11] Patent Number: 5,951,657
[45] Date of Patent: Sep. 14, 1999

[54] CACHEABLE INTERFACE CONTROL REGISTERS FOR HIGH SPEED DATA TRANSFER

[75] Inventors: David A. Wood; Steven K. Reinhardt; Shubhendu S. Mukherjee; Babak Falsafi; Mark D. Hill, all of Madison, Wis.; Robert W. Pfile, Palo Alto, Calif.

[73] Assignee: Wisconsin Alumni Research Foundation, Madison, Wis.

[21] Appl. No.: 08/871,145

[22] Filed: Jun. 9, 1997

Related U.S. Application Data

[60] Provisional application No. 60/020,343, Jun. 19, 1996.

[51] Int. Cl.$^6$ .................................................. G06F 13/14
[52] U.S. Cl. ............................ 710/55; 710/56; 710/54; 711/138; 711/171
[58] Field of Search .......................... 395/200.3, 200.8, 395/876; 711/133, 141, 171, 138; 709/200, 250; 710/56, 54, 55

[56] References Cited

U.S. PATENT DOCUMENTS

| | | | |
|---|---|---|---|
| 5,210,847 | 5/1993 | Thome et al. | 711/138 |
| 5,515,522 | 5/1996 | Bridges et al. | 711/141 |
| 5,581,705 | 12/1996 | Passint et al. | 395/200.3 |
| 5,692,154 | 11/1997 | Tucker et al. | 711/141 |
| 5,717,855 | 2/1998 | Norman et al. | 395/200.8 |
| 5,751,951 | 5/1998 | Osborne et al. | 395/200.8 |
| 5,784,699 | 7/1998 | McMahon et al. | 711/171 |

OTHER PUBLICATIONS

David A. Patterson, John L. Hennessey, Computer Architecture A Quantitative Approach, Morgan Kauffman Publishers, Inc., San Mateo, California, p. 471, 1990.

*Primary Examiner*—Thomas C. Lee
*Assistant Examiner*—Harold Kim
*Attorney, Agent, or Firm*—Quarles & Brady LLP

[57] ABSTRACT

A device interface for communicating between a processor system and a separate device employs cacheable control registers, both to indicate the receipt of a message and to receive messages to be transmitted. The data structure of the cacheable control registers may be that of a queue, minimizing the need for routine handshaking signals to clear the queue after each message. Communication of queue pointers is minimized by the use of a shadow pointer relied on as long as adequate queue space exists and queue entry valid flags which are interpreted with alternate sense for each cycling through the queue.

6 Claims, 4 Drawing Sheets

CACHEABLE INTERFACE CONTROL REGISTERS FOR HIGH SPEED DATA TRANSFER

This application is based on provisional application 60/020,343 filed Jun. 19, 1996 and priority of that application is claimed.

This invention was made with United States government support awarded by the following agencies:
DOD, Grant No. F33615
NSF, Grant Nos. CCR-9157366 and MIP-9225097.

FIELD OF THE INVENTION

The present invention relates to a high speed interface between a computer processor and a connecting device such as a communications port or peripheral using cache transfer protocols to communicate information between the device and the processor.

BACKGROUND OF THE INVENTION

A computer processor can be connected to other devices through a device interface which provides temporary storage for incoming and outgoing messages between the processor and device and which handles communication protocols. Communication protocols may include, for example: converting data from parallel to serial form, adjusting the timing of the data, and adding headers or footers to the data for transmission via the device.

Data arrives at the device interface at arbitrary times and is stored there in a buffer memory until it can be read out by the processor. Typically, the processor will be notified of the arrival of data either by an interrupt process or by a polling process. With an interrupt, an electrical line to the processor is electrically strobed causing the processor to stop its current execution of a program and to jump to a new routine for reading the device interface buffer memory. Prior to jumping to the new routine, critical data of the current routine being interrupted must be saved.

With polling, the processor in the course of executing its other programs periodically checks the buffer of the device interface to see if a new message has arrived. The polling is executed on a periodic basis regardless of whether new data has arrived at the device interface, either as part of the programs being executed or as a task in a multi-tasking operating system.

For high speed device interfaces, the interrupt process is a disadvantage because of the time consuming interrupt routines necessary to service the interrupt and to read the device interface buffers. Accordingly, polling techniques are sometimes used in which the processor periodically initiates a reading of the device interface.

The device interface will have a control register which will have one or more flag bits "set" when a message has arrived from the device. In each polling operation, the processor reads the flag bits of the control register, and if warranted, reads a message from a buffer in the device interface. Once the message has been read, the flag bits are "reset". This polling process must be repeated frequently to ensure that the limited-sized buffers of the device interface do not overflow with incoming messages.

Reading the device interface buffers may be slowed by the fact that the device interface is often connected to a specialized I/O interconnect separate from the memory interconnect of the computer. The processor is connected directly to the memory interconnect but communicates with the I/O interconnect through a bridge circuit. The bridge converts a range of physical addresses reserved for the I/O interconnect to physical addresses on the I/O interconnect, allowing the processor to communicate with a single physical address space, some of which is on the memory interconnect and some of which is on the I/O interconnect. This process of transferring data through the bridge is a potential bottle-neck to high speed communication with a device.

In order to speed the processor's writing and reading of data to and from memory, it is known to use a local cache memory associated with the processor and attached to the memory interconnect. Before a block of memory is written to or read from by the processor, it is loaded into the cache memory where it can be written to or read from at high speed without the delay associated with transferring the data over the memory interconnect.

Multiple processors each having a cache memory may be attached to a single memory interconnect and coordinated through a standard cache protocol, for example, the MOESI coherence protocol well understood to those of ordinary skill in the art. In the MOESI protocol, multiple processors can have cache copies of the data of particular memory locations and may read that data without "coherence" problems, that is, without the possibility that different caches will have different copies of the data. A processor may also write to its cache provided it obtains "ownership" of the cache data. This is done by sending out an invalidation message on the memory interconnect which lets the memory and other caches having that memory block know that their data is no longer valid.

A cache that contains data that has been invalidated in this manner may then obtain updated data by sending a message for that updated data to the memory interconnect in a broadcast fashion. The cache having ownership status in the data will then reply. A cache that has ownership of data must write that data to memory before the data is emptied from the cache.

Generally, other caches having invalid copies of the data do not request updated copies unless their associated processors need to read or write that data.

Cache architectures provide for extremely rapid data transfer both by undertaking block transfers of data, in which the overhead of the transfer can be shared among many bits of data, and by having the transfer performed by the cache circuitry in parallel or independently of the operation of the processor.

Cache transfer techniques cannot currently be used for transferring data from a device interface because the data registers, indicating that a message has arrived, are normally demarcated as uncacheable by the operating system. Making these data registers uncacheable is necessary because external occurrence such as the arrival of a message may change the state of the control registers outside of the normal cache coherence protocols, rendering the cache copies invalid but providing no indication of this. Because the contents of the control registers of the device interface are primarily of interest only when they change state (e.g., indicates a new message), caching these registers would seem to provide no benefit.

SUMMARY OF THE INVENTION

The present invention recognizes that significant speed gains could be obtained if the registers of a device interface were cacheable. This is because in many of the polling operations by the processor, no new data will have arrived and, hence, a cached copy of the control registers may be inspected providing considerable time savings over inspecting the control registers themselves. Further, the block transfer abilities of the cache protocol can render data transfer in the standard convention of a coherent cache protocol faster than a direct reading of I/O, even when the cache must be refreshed.

Accordingly, the present invention adapts the control registers of the device interface to look like a memory cache to take advantage of standard cache protocols already employed in many high performance processors.

Specifically, the present invention provides a device interface for use with a processor having a cache memory where the cache memory: (i) accepts blocks of data from memory or other caches attached to a local interconnect for use by the processor; (ii) accepts invalidation messages from other caches indicating that an accepted block of data is no longer valid; and (iii) responds to an invalidation message followed by a read of an accepted block of data by the processor by requesting a new version of the block of data. The device interface includes an interconnect connection to the local interconnect and a device connection to a device. The device interface also includes a cacheable control register holding data indicating the receipt of a message from the device connection. A controller communicating with the cacheable control register and the interconnect connection executes a stored program to respond to a change in the cacheable control register, indicating a receipt of data, by sending an invalidation message to caches on the local interconnect. The device interface also responds to a data request by a cache on the local interconnect to transfer data from the cacheable control register to the requesting cache.

Thus, it is one object of the invention to provide a high speed data transfer technique that can use existing architectures having coherent caching strategies. By making the control registers look like a cache, blocks of data may be readily transferred from the device interface to a processor's cache for rapid reading and writing.

It is another object of the invention to significantly improve the speed of polling in device interface. Those polls of the control register which ultimately indicate that no new message has arrived are executed directly from the cache memory at high speed, avoiding both interface with the memory interconnect and the local I/O interconnect.

Each control register may include a plurality of separately cacheable queue blocks sized to hold at least a portion of data received from the device interface. The controller sends an invalidation message only for the block holding the data received.

Thus, it is another object of the invention to provide for the transfer of device data via cache protocols without requiring additional communication between the cache and the device interface normally needed to empty out the cache after a message has been received. That is, after a cache associated with a processor has read the control registers, the control registers must be cleared for new incoming messages. This clearing cannot take place simply when the initial transfer to the cache has occurred because it cannot be ensured that the cache will be read by the processor after the transfer (a cache conflict might replace the data in the cache and require its reloading). A direct message from the processor to the device interface is normally required and this adds time to the data transfer. In the present invention, by using a queue structure, this direct message in the form of a queue head pointer, is avoided until after a number of messages have been received. Thus the burden of this task is reduced.

The tail pointer indicating the latest message in the queue may be implemented as a bit in each queue block whose state indicates whether the queue block holds a valid message.

Accordingly, it is another object of the invention to eliminate additional interconnect traffic to transmit a current tail pointer indicating to the receiving device the location of the last valid message. A valid message may be indicated by the state of a bit transmitted with queue block itself.

The processor may change its interpretation of this tail flag bit after each block in the queue has received a message once.

Thus it is yet another object of the invention to avoid the need to reset the bits that serve as the tail pointer after the associated message has been processed. In each cycling through the queue, the opposite sense of bit indicates a message that is pending, so no resetting is required.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made, therefore, to the claims for interpreting the scope of the invention.

DETAILED DESCRIPTION OF THE PREFERRED EMBODIMENT

System Architecture

Figure 1:
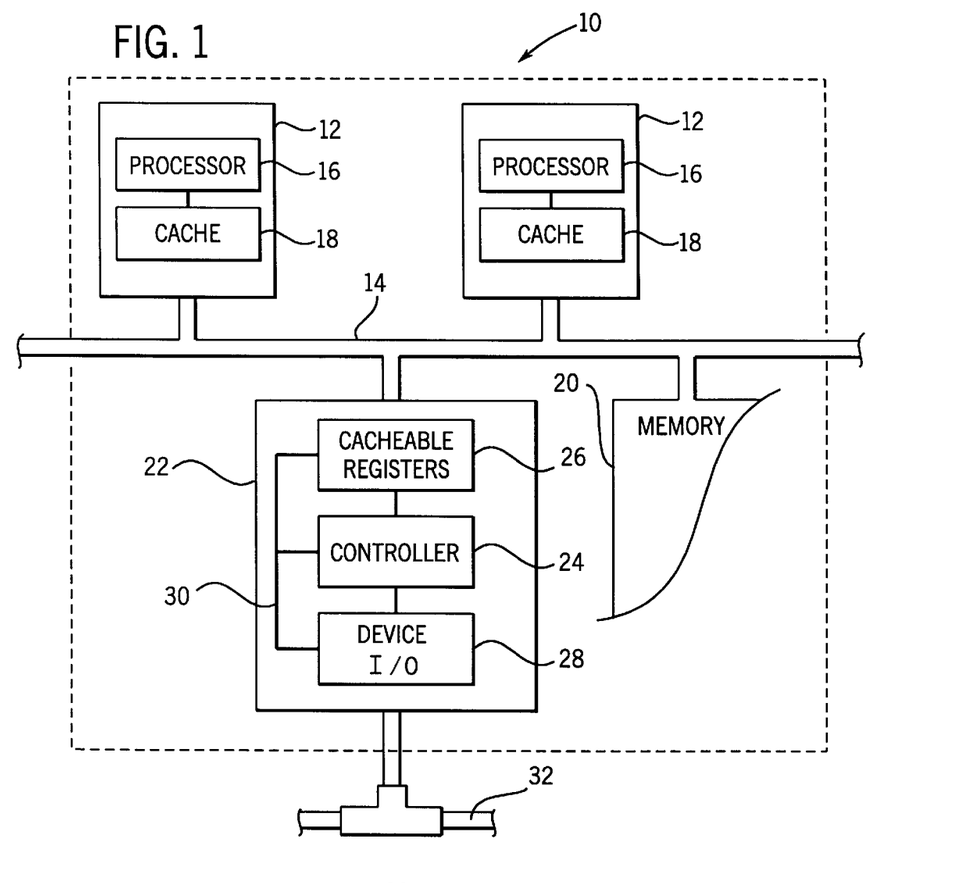
FIG. 1 is a block diagram of a computer architecture suitable for use with the present invention showing two processors each having an associated memory cache attached to a memory interconnect which is also connected to a device interface of the present invention having cacheable registers.

Referring to FIG. 1, a computer system 10 having an architecture suitable for use with the present invention includes multiple processing units 12 connected to a common memory interconnect 14. Each processor unit 12 includes a processor 16 and a memory cache 18 observing standard coherent caching protocols as are understood in the art. Generally, the caches 18 obtain data from a block of memory addresses from a memory 20 also attached to the memory interconnect 14. The data thus collected in the cache 18 may be directly accessed by the processor 16 as if it were the memory 20. A shared copy of this data may also be held by other caches 18.

Reading valid data by the processor 16 from the cache 18 may be done without coordination with the other caches 18. Writing data from the processor 16 to the cache 18 is permitted only if the cache 18 has ownership of that data. This ownership is obtained by inter-cache communication in the form of an invalidation message to other caches and the memory 20. The result of the invalidation message is that requests for the data from the other caches are essentially redirected to the cache having ownership. The caches to whom the requests are made request updated data from the exclusive owner. Caches also request data if the processor has requested a reading of a range of addresses not previously in the cache 18.

Communication between the processor and the cache (e.g., reading or writing) is much faster than communication directly between the processor unit 12 and the memory 20. This is because of the faster effective data clocking speeds allowable between the processor and the cache, the lack of competition for the communications channel by other processor units 12, and the ability of the cache 18 to transfer larger sized messages with single instructions.

Also, attached to the memory interconnect 14 is a device interface 22 having a controller 24 communicating with cacheable registers 26 and a device I/O circuit 28 via an internal interconnect 30. The device I/O circuit 28 is connected to a device such as a data storage device (e.g., magnetic or optical storage devices), a data I/O device (e.g., sound or video interfaces) or in the present example a high speed network 32 to receive data from that network 32 and transmit data onto that network 32 as instructed by one or more processor units 12. It will be understood from the following description that the network 32 may be regarded as simply a connection to a generalized device. The device I/O circuit 28 provides a low level interface to the protocol of the network 32 such as is well known in the art.

The interface among the processing units 12, the device interface 22 and the memory interconnect 14 are according to standard techniques well known in the art.

Cacheable Register Data Structure

Figure 3:
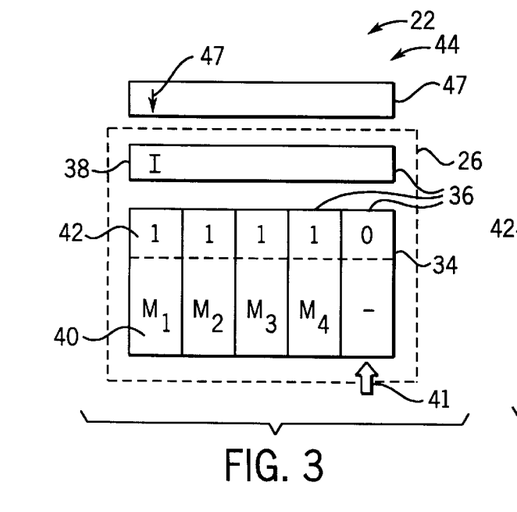
FIG. 3 is an enlarged view of a cacheable register immediately before each queue element of the cacheable register has been used once.

The controller 24 is programmed via an internal read-only memory (not shown) to create a specific data structure within the cacheable registers dividing messages among separately cacheable blocks of the cacheable registers 26. Referring to FIG. 3, the data structure in the cacheable registers 26 includes a queue 34 of separately cacheable blocks 36 and a head pointer 38 in yet another separately cacheable block 36. A shadow head pointer 47, similar to the head pointer 38, is held in a non-cacheable block 44, that is to say, in local memory in device interface 22.

Figure 4:
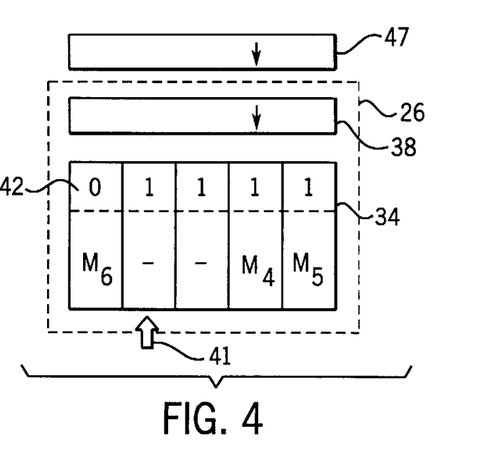
FIG. 4 is a figure similar to that of FIG. 3 showing the cacheable register of FIG. 3 after an additional two messages have been received and showing an updating of a head pointer and a shadow head pointer and a sense reversal in interpreting message valid bits.

In the queue 34, each cacheable block 36 includes a message storage area 40 and a validity bit 42. As depicted, there are five cacheable blocks 36 in the queue 34. The head pointer 38 normally points to one of the cacheable blocks as indicated in FIG. 4 by an arrow (see, for example, FIG. 4) or is invalid as indicated by an "I" (see for example FIG. 3). Each validity bit 42 may be set indicated by a value of 1 or reset indicated by a value of 0.

According to typical conventions, the queue 34 receives messages in the message storage areas 40 of the cacheable blocks 36 on a cyclic basis starting with the left most block adding new messages to blocks going rightward until the final block is reached. The queue 34 then receives new messages at the left most block (writing over the old messages) in a cyclic fashion provided those blocks have had their messages read. Messages are enrolled in the queue at blocks pointed to by an implicit tail pointer 41 whose location is determined by the validity bit 42 as will be described below. It will be understood, however, that the tail pointer may be an explicit pointer value. Messages are read from the queue 34 at the location of the head pointer 38. If the head pointer 38 and the tail pointer 41 are in the same position, the queue is considered to be empty.

Operation of the Device Interface in Receiving a Message From the Device

Generally, under the control of the controller 24, information received by the device I/O circuit 28 will be stored in the cacheable registers 26 and standard cache protocol signals will be transmitted by the device interface 22 on the memory interconnect 14 to communicate that information to the processor units 12.

Figure 2:
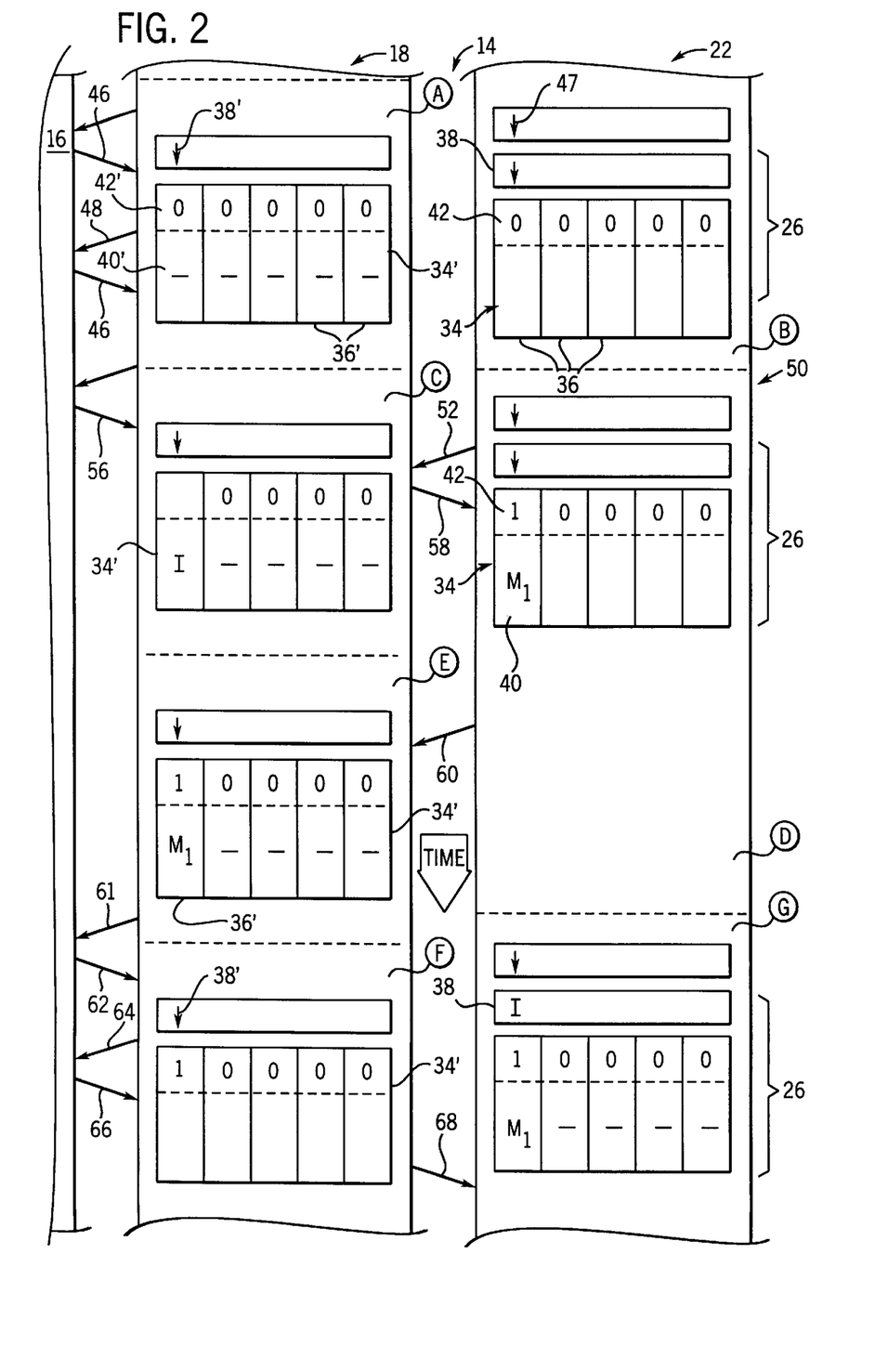
FIG. 2 is a graphical plotting of the transfer of messages between the caches and the cacheable registers of FIG. 1 against time showing the state of the cacheable registers at different times.

Referring to FIG. 2, the processor 16, following normal network polling techniques, will periodically poll the cache 18 for information concerning the cacheable registers 26 of the device interface 22 via messages 46 (indicated by arrows) between the processor 16 and the cache 18. For this purpose, the cache 18 will have previously obtained a nonexclusive copy of the cacheable registers 26 in queue 34', the particular instance of which is indicated at letter A.

The poll message 46 sent from the processor 16 to the cache 18 will determine whether the queue 34' holding the data of cacheable registers 26 is empty and hence whether there are messages waiting for the processor 16. In particular, the processor 16 obtains a copy of the head pointer 38' unique to that processor 16 and reviews the status bit 42' in the cacheable block 36' pointed to by the pointer 38'. It compares the value of this status bit 42' to an internal interpretation bit (not shown) which is initially in a state 0. The tail pointer is considered to be pointing to the first or left most block of the queue 34', having a validity bit not matching the internal interpretation bit.

In this case, the processor 16 will determine that the queue 34' is empty because the head pointer 47 points to the same location as the tail pointer, i.e., the left most cacheable block 36' of the queue 34'. This information that the queue is empty is represented by arrow 48 from the cache 18 to the processor 16.

It will be understood that so long as no message has arrived at the device interface 22 and the queue 34' remains empty, the repeated polling of the cache 18 by the processor 16 will be performed in an extremely rapid manner, that is, directly between the processor 16 and the cache 18 with no need to transfer information on the memory interconnect 14.

Referring now to the device interface 22 and the cacheable register 26 indicated at the letter B, a message 50 may arrive from the network 32 at a random time with respect to this polling process of messages 46 and 48. Prior to arrival of the message 50, the queue 34 of the cacheable register 26 is empty, that is, the head pointer 38 points to the left most cacheable block of the queue 34 and the validity bit 42 of that cacheable block indicates that the block entry is empty.

As described, the controller 24 of the device interface 22 treats the cacheable registers 26 as a conventional cache 18 and, therefore, prior to writing to the cacheable registers 26 the message 50, an invalidation message 52 is transmitted over the memory interconnect to the caches 18 so as to obtain ownership of the data of the cacheable registers 26 per standard cache protocol. This invalidation message 52 applies only to the left most block cacheable block 36 of the queue 34 in the cache 18 and causes that block to be invalidated as indicated by a I in the queue 34' as indicated at letter C.

Immediately after exclusivity is gained of the data of the cacheable registers 26, the message 50, indicated by $M_1$, is enrolled in the left most block of the queue 34' in the device interface 22 as indicated at letter D. The device interface 22 also sets the validity bit 42 of the first cacheable block of the queue 34 to 1 indicating that it contains a message $M_1$ stored in area 40 and moving the effective tail pointer to point to the second cacheable block 36 in the queue 34.

No further cache protocol signals need be transmitted on the memory interconnect 14 until a second poll signal 56 is received from the processor 16 by the cache 18 for the information in the image of the cacheable registers 26. Because the left most block pointed to by the head pointer 38' is now invalid, this polling request of the data pointed to by the head pointer 38' causes the cache 18 to generate a request 58 for a new copy of the data of the cacheable registers 26. This request 58 is transmitted on the memory interconnect 14.

This request 58 from the cacheable registers 26 is broadcast generally on the memory interconnect 14 but is ignored by the memory 20 and other caches 18 because ownership of the contents of the cacheable registers 26 is currently maintained by the device interface 22. Accordingly, the device interface 22 responds with message 60 providing message $M_1$ at letter E. Now the cache 18 can respond to the processor 16 via message 61 which indicates that the cacheable block 36' pointed to by the head pointer 38' is full. The processor 16 may thereafter request a read of the message $M_1$ via command 62 and that message $M_1$ may be provided to the processor 16 via message 64.

Once the message $M_1$ has been received by the processor 16, the processor 16 writes to the cache 18, as indicated by message 66, a new value of the head pointer 38' indicating that the information in the first queue block has been read as indicated at letter F. For the moment, this information need not be relayed to the device interface 22.

The writing of the head pointer 38' causes an invalidation message 68 to be sent to the device interface 22 invalidating its head pointer 38 as indicated at letter G. Note, later writing of head pointer 38 does not cause an invalidation message to be sent out unless ownership has been lost.

In summary, multiple polls between the processor 16 and the cache 18 may be accomplished simply by processor to cache communication provided no message has arrived. When a message arrives, a single high speed transfer between the cacheable registers 26 and the cache 18 over memory interconnect 14 is required as indicated by request 58 and message 60. Subsequent messages for updating the head pointers are simply between the processor 16 and the cache 18 with the exception of the invalidation message 68 for the head pointer in the device interface 22. As will be seen, however, this latter invalidation message 68 typically is only sent a few times for every cycle through the queue 34 and thus contributes only a small communications burden on a per message basis. Further, updating the head pointers of the device interface 22 is required only each time the queue 34 has been filled.

Updating of the Head Pointer

Referring now to FIG. 3, as additional messages $M_1$, $M_2$, $M_3$ and $M_4$ are received by the device interface 22, they are enrolled in succeeding blocks 36 of the queue 34 and the corresponding validity bits 42 are set to 1. During this time the head pointer 38 indicating whether messages have been processed by the processor 16 remains invalid as caused by message 68 of FIG. 2. This is initially of no concern, however, as the purpose of the head pointer 38 is simply to provide an indication of which queue blocks 36 have been freed up and early on there remains adequate queue blocks 36 even if no queue blocks 36 have been emptied by the processor 16.

When the implicit location of the tail pointer 41 is at the last cacheable block 36, as indicated in FIG. 3, the next message received is enrolled in that last cacheable block 36 and based on the shadow head pointer 47, the queue 34 now appears to be full. This may not in fact be true; the head pointer 38 may have been advanced by the processor 16, but this cannot be determined because the data of the head pointer 38 is invalid. Accordingly, at this time the device interface 22 will initiate a request for updating the head pointer 38.

Referring now to FIG. 4, the result of this updating is used to adjust both the shadow head pointer 47 and the actual head pointer 38 and may indicate, for example, that the first three blocks 36 of the queue 34 have been read by the processor 16 thereby moving the head pointer 38 to the fourth cacheable block 36 in the queue 34 as depicted in FIG. 4.

Validity Bit Sense Reversal

The message $M_6$ may be enrolled in the first cacheable block 36 of the queue 34 and the implicit location of the tail pointer 41 may, therefore, move forward to the second cacheable block 36. Rather than resetting each of the validity bits 42 with each cycling through the blocks 36 of the queue 34, the comparison bit to which the validity bit 42 is compared is simply reversed in state so that in this second cycling through the queue 34, values of 0 indicate valid message and values of 1 indicate messages which are not valid.

This approach requires only that the controller 24 determine how many times the head pointer 38 has moved through the queue blocks 36 to determine how to interpret the bit 42. On the other hand, this sense reversal of the bits 42 eliminates the need to send a clearing message on the memory interconnect 14 to clear these bits 42 and thus to effectively move the tail pointer 41.

Flow Chart of Device Interface Firmware

Figure 6:
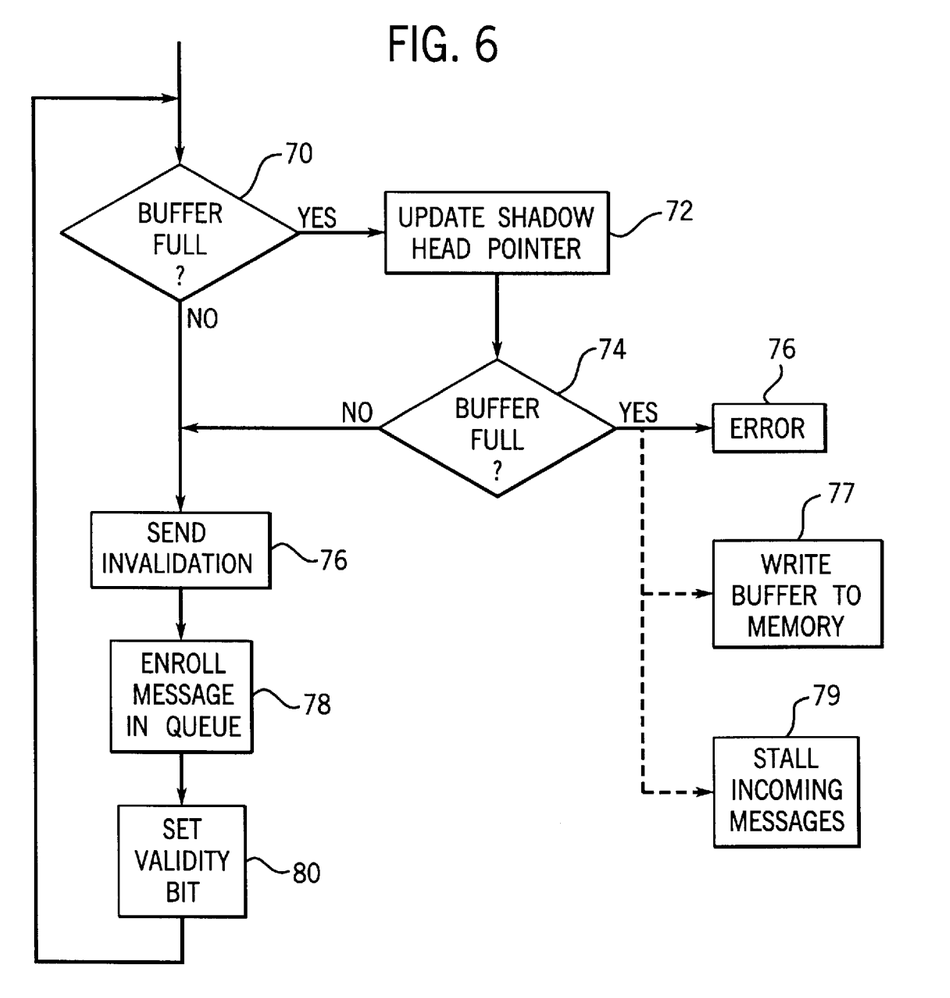
FIG. 6 is a flow chart showing the principal steps required in transferring a message between a cache and a cacheable register.

Referring now to FIGS. 2 and 6, when a message 50 is received by the device interface 22, the controller 24 undertakes several steps. First, at decision block 70, it checks the cacheable registers 26 to see if the queue 34 is full, the queue 34 acting as a buffer of incoming messages. The queue 34 will be considered full if the virtual location of the tail pointer 41 is equal to the location of the shadow head pointer 47.

In this case (buffer full), the controller 24 proceeds to process block 72 to update the shadow head pointer 47 as described with respect to FIG. 3 above. After the shadow head pointer 47 has been updated, the queue 34 is again checked to see if it is full at decision block 74.

If so (buffer still full), an error message is generated as indicated by process block 76 and handled or the incoming message is stalled per process block 79, as is generally understood in the art. In an alternative embodiment, as indicated by process block 77, the controller 24 may perform a write back operation to memory 20 by storing the contents of the queue 34 at a corresponding image of the queue according to normal cache operation where the cache simply has a copy of the memory data. Subsequent requests by other processors for the data received by the device interface 22 and stored in the memory are then serviced directly by the memory. In this way the effective size of the queue 34 may be greatly expanded while preserving the efficient cache type data transfer. Data received by the queue 34 is transferred to memory 20 only when overflow of the queue 34 is imminent, to eliminate unnecessary transfer operation. Prior to such transfer, and after the invalidation of the data in caches of other processors, requests for updated data is provided by the cacheable register 26 rather than the memory 20 by the cacheable control register's transmission of an "ownership" message or "memory inhibit" message indicating that the cacheable control 26 has the most up-to-date version of the data, per standard cache protocols.

More typically, updating the shadow head pointer 47 at process block 72 will free buffer space and the controller 24 will branch to process block 76, the same process block that the program proceeds to if at decision block 70 the queue 34 is not full. This process block 76 sends an invalidation message 52 out to the other processor units 12 to indicate that if they have copies of the cacheable registers 26, those copies are now invalid.

At succeeding process block 78, the message 50 arriving from the network 32 is enrolled in the queue 34 and the validity bit 42 is set, as indicated at process block 80. The program then loops back to decision block 70 and proceeds in this manner indefinitely.

The setting of the validity bit of process block 80 is done by flipping the bit in accordance with the sense reversal that occurs with each cycling through the queue 34, as has been described above.

The device interface 22 in other respects, as has been described above, operates in accordance with standard cache protocols treating the cacheable registers 26 as a standard memory cache.

Operation of the Device Interface in Transmission of a Message to the Device

Similar cache protocol techniques may be used when the processor unit 12 needs to transmit information on the network 32. Here the processor 16 provides information to the cacheable registers 26 for transmission under control of the controller 24. Again, the controller 24 is programmed via an internal read-only memory (not shown) to create and respond to cache protocol signals with the caches 18, as will be described below.

Figure 5:
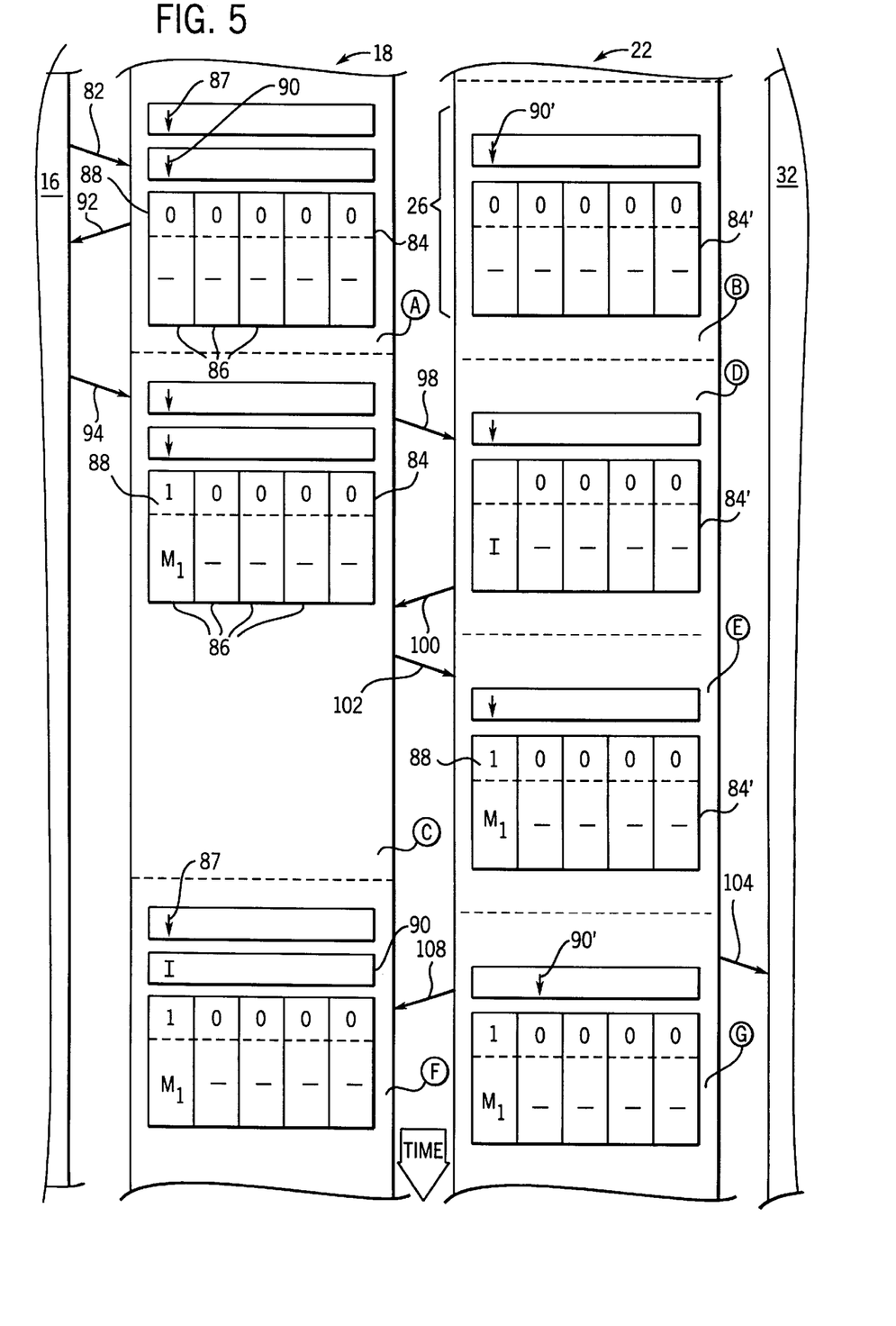
FIG. 5 is a figure similar to that of FIG. 2 showing the changes in the cacheable registers for a processor initiated message.

Referring now to FIG. 5, transmitting a message on the network 32 is essentially identical to receiving a message from the network 32 with the roles of the cache 18 and the device interface 22 reversed.

Transmission of a message from the processor 16 to the network 32 begins with the processor 16 requesting the status of a queue 84 (different from the queue 34 but similar in structure) to determine whether it is full. This information is requested via a message 82. The transmission queue 84 and the receiving queue 34 are generally different memory structures to prevent conflicts between ingoing and outgoing messages.

This process of determining whether there is room in the queue 84 follows the same procedure previously described with respect to FIGS. 2 and 6, and in particular, decision block 70 of FIG. 6. That is, a shadow head pointer 87 is used to identify a particular block 86 of the queue 84 and based on an internal sense bit, a validity bit 88 of that cacheable block 86 and succeeding blocks are interrogated to find the first empty cacheable block 86 to ensure that there are remaining empty blocks. As indicated at letter A in FIG. 5, the queue 34 is initially empty. It will be understood that an explicit tail pointer could be implemented to eliminate the interrogation of the cacheable blocks 86.

If, however, as was described with respect to FIG. 6, no blocks 86 are available, the shadow head pointer 87 is first updated with an actual head pointer 90' from the device interface 22.

A reply message 92 is returned to the processor 16, and assuming that there is room in the queue 84, the processor 16 in turn sends the message 94 to be transmitted to the queue 84. Because a writing to queue 84 is to occur, an invalidation message 98 is sent from the cache 18 to the device interface 22 so as to obtain ownership of the data of the queue 84. After ownership had been obtained, the message $M_1$ is enrolled in the first cacheable block 86 of that queue 84 and the corresponding validity bit 88 is set as indicated at letter C.

The cache 84' is initially empty as indicated at letter B. Upon receiving the invalidation message 98, the first cacheable block 86' of the cache 84' is invalidated as indicated at letter D. Unlike the situation where a message is received, the controller 24 of the device interface 22 immediately or after a programmable delay requests an updating of the invalidated block through message 100. This effectively is an internal polling by the device interface 22 based on its recognition that a message is available from the processor 16 as indicated by the invalidation message 98.

The processor responds with a message 102 enclosing the message $M_1$ and the validity bit 88 whose purpose has been previously described. This message is enrolled in the queue 84' as indicated at letter E. The controller 24, in turn, repeatedly polls the queue 84' in much the same manner as the processor 16 in the message receipt mode, and soon recognizing the presence of an untransmitted message in the queue 84, sends a message 104 on the network 32 and then updates the head pointer 90' as indicated at letter G.

The controller 24 then sends an invalidation message 108 back to the cache 18 which invalidates the head pointer 90 in the cache 18 as indicated at letter F. As has been described before, the cache 18 does not update its invalidated head pointer 90 until, relying on the shadow pointer 87, there would appear to be no room in the queue 84.

Thus, the present invention: 1) minimizes the time required for polling when no new message has arrived; 2) employs the efficient block transfer of caching techniques in obtaining the message; 3) minimizes the need for handshaking signals by using a queue structure; and 4) minimizes the transmission of queue pointers by using a sense reverse technique of validity bits to indicate valid messages and a shadow pointer to serve between occasional updates of a true head pointer.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

We claim:

1. A device interface for use with a processor communicating with a main memory and I/O devices through a local interconnect, the processor having a cache memory;

(i) accepting blocks of data through the local interconnect for use by the processor;

(ii) accepting invalidation messages through the local interconnect from other caches indicating that a previously accepted block of data is no longer valid;

(iii) responding to an invalidation message followed by a read of an accepted block of data by the processor by requesting a new version of the block of data; and (iv) responding to a request for data by transmitting data on the local interconnect;

the device interface comprising:
(a) an interconnect connection to the local interconnect;
(b) a device connection to a device;
(c) a cacheable control register communicating with the device connection and holding data indicating the receipt of a message from the device connection; and
(d) a controller communicating with the cacheable control register and the interconnect connection executing a program to:
(i) respond to a change in the cacheable control register indicating a receipt of data by sending an invalidation message to caches on the local interconnect holding data of the cacheable control registers; and
(ii) respond to a data request by a cache on the local interconnect to transfer data from the cacheable control register to the requesting cache;

wherein the control register includes a plurality of separately cacheable queue blocks each sized to hold at least a portion of data received from the device interface and wherein the controller in step (i) sends an invalidation message only for a queue block holding the data indicated as received by the control register;

wherein the data requested is of a particular queue block and wherein the controller further executes the stored program to:
(iii) respond to an indicating by the cache on the local interconnect that the data requested has been read from the cache by an associated processor, by freeing the particular queue block for new data;

wherein the controller further executes the stored program to:
(iv) transmit a request to the processor associated with the cache for an indication that the data requested has been read from the cache by the processor only when at least two queue blocks hold data.

2. The device interface of claim 1 wherein the device is selected from the group consisting of: a communications network, a data storage device, and an I/O device.

3. The device interface of claim 1 wherein the controller further executes the stored program to:
(iii) respond to an indication by the cache on the local interconnect that the data requested has been read from the cache by an associated processor, by freeing the cacheable control register for new data.

4. The device interface of claim 1 wherein the memory responds to a data request for the data of the cacheable control registers by outputting the data on the local interconnect except when an ownership signal is received by another device on the local interconnect;

and wherein the controller is further programmed to:
(iii) transfer data of the cacheable control registers to the memory when the cacheable control registers become full;
(iv) prior to step (iii) respond to a data request by a cache on the local interconnect for the data by transmitting to the memory an ownership signal; and
(v) subsequent to step (iii) respond to a data request by a cache on the local interconnect for the data by allowing the memory to respond to the request.

5. The device interface of claim 1 wherein the memory responds to a data request for the data of the cacheable control registers by outputting the data on the local interconnect except when an ownership signal is received by another device on the local interconnect;

and wherein the controller is further programmed to:
(iii) transfer data of the cacheable control registers to the memory when the cacheable control registers become full;
(iv) prior to step (iii) respond to a data request by a cache on the local interconnect for the data by transmitting to the memory an ownership signal; and
(v) subsequent to step (iii) respond to a data request by a cache on the local interconnect for the data by allowing the memory to respond to the request.

6. A device interface for use with a processor communicating with a main memory and I/O devices through a local interconnect, the processor having a cache memory;
(i) accepting blocks of data through the local interconnect for use by the processor;
(ii) accepting invalidation messages through the local interconnect from other caches indicating that a previously accepted block of data is no longer valid;
(iii) responding to an invalidation message followed by a read of an accepted block of data by the processor by requesting a new version of the block of data; and
(iv) responding to a request for data by transmitting data on the local interconnect;

the device interface comprising:
(a) an interconnect connection to the local interconnect;
(b) a device connection to a device;
(c) a cacheable control register communicating with the device connection and holding data indicating the receipt of a message from the device connection; and
(d) a controller communicating with the cacheable control register and the interconnect connection executing a program to:
(i) respond to a change in the cacheable control register indicating a receipt of data by sending an invalidation message to caches on the local interconnect holding data of the cacheable control registers; and
(ii) respond to a data request by a cache on the local interconnect to transfer data from the cacheable control register to the requesting cache;

wherein the control register includes a plurality of separately cacheable queue blocks each sized to hold at least a portion of data received from the device interface and wherein the controller in step (i) sends an invalidation message only for a queue block holding the data indicated as received by the control register;

wherein the control register includes a head pointer indicating a first one of the queue blocks holding a message not read by the processor and a tail pointer indicating a last one of the queue blocks holding a message and wherein the controller performs a request of the processor for an updating of the head pointer only when the tail and head pointers indicate that more queue blocks are needed for data;

wherein the tail pointer is a bit in each queue block whose state indicates whether the queue block holds a message;

wherein the processor adopts an opposite interpretation of the bit in each queue block after each block in the queue has received a message once.

* * * * *